INVENTOR.
GENUNG L. CLAPPER
BY [signature]
ATTORNEY

PULSE SIGNAL AMPLIFIER BOOTSTRAP ACTION

Filed Dec. 31, 1954

INVENTOR.
GENUNG L. CLAPPER
BY
[signature]
ATTORNEY

June 20, 1967 G. L. CLAPPER 3,327,241

PULSE SIGNAL AMPLIFIER BOOTSTRAP ACTION

Filed Dec. 31, 1954 3 Sheets-Sheet 3

INVENTOR.
GENUNG L. CLAPPER
BY [signature]
ATTORNEY 3,327,241

PULSE SIGNAL AMPLIFIER BOOTSTRAP ACTION

Genung L. Clapper, Vestal, N.Y., assignor to International Business Machines Corporation, New York, N.Y., a corporation of New York Filed Dec. 31, 1954, Ser. No. 479,147
4 Claims. (Cl. 330—156)

The present invention relates to pulse signal translating systems and, in particular, to such systems for translating signals of pulse wave form having short pulse rise and fall times.

There are many applications where it is desirable to transmit signals of pulse wave form over transmission lines of appreciable length and relatively high inherent capacity. One such application, for example, is the transmission of serially coded information from one point to a more distant point in a large digital computer. In order to minimize phase shift caused by impairment of the pulse rise time in position going pulses, the line-driver signal translating stage should be capable of supplying a large amount of power to the line at the moment the leading edge of each pulse occurs. Similarly, preservation of fidelity of the pulse wave form requires that an equal amount of power be absorbed from the line at the moment of pulse termination; otherwise, the trailing edge of the pulse experiences an undue amount of spreading or distortion. Equally important is the requirement that the pulse-signal translating stage present low impedance to the line between pulses so that spurious "cross-talk" shall be minimized.

It has been proposed in the G. L. Clapper et al. application, Ser. No. 346,939, filed Apr. 6, 1953, now abandoned, entitled Driver Circuit, and assigned to the same assignee as the present application, that a cathode follower type of signal translating stage be used in combination with an anode-loaded translating stage by which to translate with fidelity of wave form pulses having steep leading and lagging edges even though the circuit to which the pulses are supplied has large inherent capacitance. The cathode follower type of translating stage is capable of supplying a large amount of power to a capacitive circuit at the leading edge of the pulse. It adversely effects the termination of the pulses, however, for the reason that the electrical energy stored in the output-circuit load capacitance must be discharged through the cathode resistor of the stage and the load resistance considered in parallel. The resulting discharge interval is usually appreciable, and this is especially true where the load resistance has an appreciably large value, as where a transmission line terminated in one or more positive coincidence diode switches. Certain of the deleterious effects of the one-way power handling capabilities of the cathode follower type of stage may be overcome by very substantially lowering the value of the cathode resistor. This necessitates either a larger and more expensive tube with a higher plate discharge or the use of several tubes in parallel.

In accordance with the Clapper et al. application above mentioned, an anode-loaded translating stage is effectively connected in parallel with the cathode resistor of the cathode follower stage. A phase inverter stage is used to charge the polarity of negative-going pulses applied to the anode-loaded stage to positive-going pulses at the cathode follower stage. Thus, the latter supplies large amounts of power to the capacitance load at the leading edge of an applied pulse, whereas the anode-loaded stage absorbs large amounts of power at the trailing edge of the applied pulse. This insures short pulse rise and fall of times without the use of expensive tubes having high plate dissipation or the use of several tubes in parallel. It would be desirable to simplify this arrangement without impairing its unique performance characteristics.

It is an object of the present invention to provide a new and improved pulse signal translating system of simple and inexpensive arrangement and one which avoids one or more of the disadvantages and limitations of prior pulse translating systems of the types described.

It is a further object of the invention to provide a novel pulse signal translating system which is characterized by exceptionally short pulse ries and fall times even when supplying the translated signal to transmission lines or other circuits having relatively large values of inherent capacitance.

It is an additional object of the invention to provide a improved pulse signal translating system which effectively provides dynamic modification of the value of cathode impedance employed in a cathode follower type of signal translating stage by which substantially to enhance the desired preservation of fidelity of wave form of a translated pulse having very short pulse rise and fall times.

It is yet a further object of the invention to provide an improved pulse signal translating system which exhibits high voltage gain with good pulse amplitude limiting at preselected upper and lower amplitude values.

It is an additional object of the invention to provide a pulse signal translating system providing such rapid pulse rise and fall times that it has high utility either as a bistable or free-running multivibrator readily operable at several megacycles per second.

In accordance with the invention, pulse signal translating system embodying the invention inlcudes a first and second signal translating stage coupled in tandem with the first stage inverting a pulse signal appearing in its input circuit to one of opposite polarity in the input circuit of the other stage. The last stage of the tandem arrangement is of the cathode follower type, and a unidirectional coupling device or circuit is provided between the cathode impedance of the cathode follower stage and the output or anode circuit of the other stage by which dynamically to modify the load impedance of the cathode follower stage by the operation of the other stage.

Other objects and advantages of the invention will appear as the detailed description thereof proceeds in the light of the drawings forming a part of this application, in which:

FIG. 1 is a circuit diagram, partly schematic, representing a pulse signal translating system embodying the present invention in a particular form;

FIGS. 2 and 3 graphically represent certain operating characteristics of the FIG. 1 arrangement and are used as an aid in explaining its operation;

Figure 1:
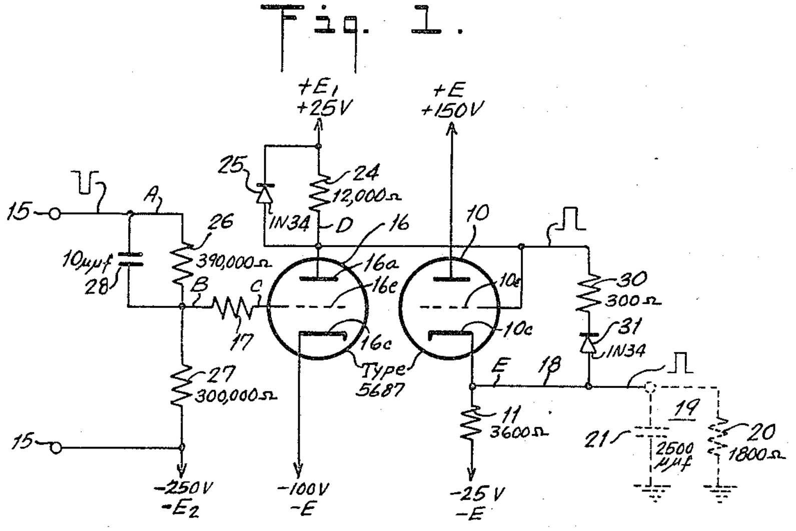

Referring now are more particularly to FIG. 1, the translating system here shown includes a triode form of vacuum tube 10 having a cathode 10*c* connected to ground through a cathode load resistor 11, an anode 10*a* connected to a source of energizing potential +E, and a control electrode 10*e* coupled to the output circuit of an anode-loaded translating stage producing phase inversion of applied pulses. The latter includes a vacuum tube having a cathode 16*c* connected to the negative terminal of the energizing source —E.

The anode 16*a* of the tube 16 is connected through an anode load resistor 24 to a source of anode energizing potential $+E_1$, which is indicated in the drawing as having a representative value of +25 volts. The anode resistor 24 has connected in shunt thereto a diode rectifier device 25, for a purpose presently to be explained, poled in such manner as to be non-conductive for normal flow of anode current from the source $+E_1$ to the anode of the tube 16.

A resistive potential divider comprised by series connected resistors 26, 27 is shown connected across a pulse-signal input circuit 15, and the control electrode **16*e* of the tube 16 is coupled through a resistor 17 to the juncture of the resistors 26 and 27. A condenser 28 is connected across the resistor 26 to emphasize the higher frequency harmonic components of an applied input pulse. The lower potential input circuit terminal 15 is connected to the negative terminal $-E_2$ of the energizing potential source, which is indicated as having a representative value of −250 volts below ground potential. The anode 16*a* of the tube 16 is connected to the control electrode 10*e* of the tube 10, as earlier mentioned, and is coupled through a resistor 30 and diode rectifier 31 to an output circuit conductor 18. The latter is connected to the cathode resistor 11 and supplies positive-going pulses to an output load impedance 19 which may, for example, be comprised of a transmission line having a resistive terminal impedance 20 and a substantial value of inherent shunt capacitance 21. Representative values of energizing potentials +E, −E and $-E_3$ for the other elements of tubes 10 and 16**, as well as representative values of circuit components, are indicated in the drawing, all potential values being considered with respect to ground potential.

Figure 2:
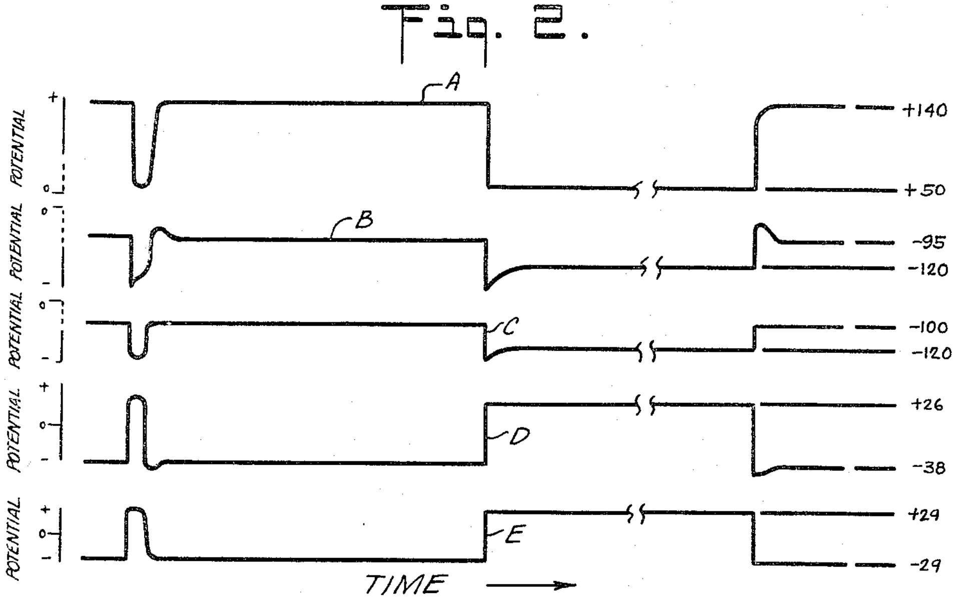

Considering the operation of the FIG. 1 arrangement, and referring to the curves of FIG. 2 which graphically represent certain potential relationships appearing at selected points in the translating system, the vacuum tube 16 is normally conductive and the tube 10 normally non-conductive in the absence of an applied negative-going pulse at the input terminals 15. With the representative operating potentials and component values indicated in the drawing, the tube 16 is rendered non-conductive by an applied negative-going pulse at the input circuit 15 (point A) decreasing in value from +150 volts to +50 volts. Curve A of FIG. 2 represents two such pulses so chosen, by way of illustration, that the first has a relatively short duration and the second a much longer duration. These pulse lengths are selected purely for purposes of more fully explaining the system operation. The applied pulses at point A appear with reduced amplitude at point B, as indicated by curve B or FIG. 2, due to the action of the input voltage divider 26, 27. The pulse appearing at point C is represented by curve C in FIG. 2 and is applied to the control electrode **16*e* of tube 16**.

Prior to this, the tube 16 was fully conductive and the voltage at point D due to the voltage drop across the resistor 24 is negative with respect to the voltage at point E by approximately 10 volts. The latter voltage appears between the electrode **10*e* and cathode 10*c* to the tube 10 and maintains this tube cut off between pulses. When, however, a negative-going pulse is applied to the control electrode 16*e* of tube 16, this tube becomes non-conductive allowing point D to rise toward +25 volts which is the value of anode energization. The diode rectifier device 31 is so poled that if the inherent capacitance 21 of the load impedance 19 is large any lag in the rise of potential at point E will not restrict the rise in potential at point D, the device 31 thus isolating the anode circuit of tube 16 from the output circuit 18 under this condition. The potential change at point D during the occurrence of each pulse is represented by curve D of FIG. 2, from which it will be seen that the negative-going applied pulse at input terminals 15 is reversed to a positive-going pulse and applied to the cathode follower stage 10. Each such applied pulse has sufficient amplitude to produce a small flow of current in the electrode 10*e*, thus insuring that the cathode follower stage 10 is rendered fully conductive allowing a high peak current to flow into the capacitance 21 of the load 19. Point E of the output circuit 18 will rise to about +29 volts with respect to ground at this time, but the limiting diode rectifier 25** will limit the point D to approximately +26 volts.

After the termination of the input pulse, full conductivity will be quickly restored to the tube 16 and the charge in the load capacitance 21 will quickly discharge through the diode rectifier device 31, the resistor 30 and the tube 16. This discharge current in flowing through the resistor 30 produces a large negative bias on the control electrode **10*e* of the tube 10 and quickly biases this tube to its non-conductive state, thus rapidly to terminate any additional supply of power through the tube 10 to the load 19. The voltage at point E in the output circuit 18 accordingly drops rapidly to its quiescent value which is approximately −30 volts. The wave form of pulses translating to the output circuit 18 is represented by curve E of FIG. 2. It will be apparent that the cathode follower stage 10 is capable of supplying a large amount of power to the load 19 during the pulse rise time, while the driver stage 16 is capable of absorbing an equal amount of power from the load 19 at the termination of the pulse. This insures short pulse rise and fall times. Further, since the driver stage 16 is normally fully conductive during the intervals between applied pulses, it presents a low impedance to the load 19 during such intervals and thereby minimizes spurious "cross-talk" which might otherwise tend to be developed in the output circuit 18 by associated or adjacent electrical apparatus. In effect, the driver stage 16 operates dynamically to modify the cathode load impedance of the stage 10**, permitting the latter to have its normal relatively high impedance during each applied pulse but much lower impedance between applied pulses.

Figure 3:
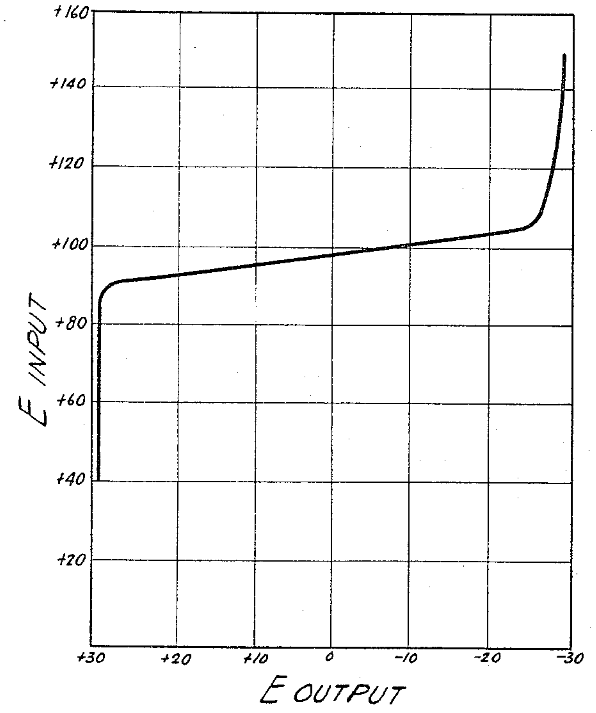

FIG. 3 represents the overall translating characteristic curve of the FIG. 1 system showing output voltage in the output circuit 18 plotted against input voltage at the input terminals 15. It will be noted that the cross-over point is located near +100, and that a relatively small change of input voltage from +110 to +90 volts produces a relatively large output voltage change from −26 volts to +28.5 volts. The steepness of the curve at the cross-over point is indicative of the large voltage amplification at this point, thus producing a definite shaping action on the output pulse, while the portion of the curve with zero slope representing cut-off and saturation are of considerable extent and provide standardization of the output pulse level in the nature of pulse limiting between upper and lower amplitude levels.

Figure 4:
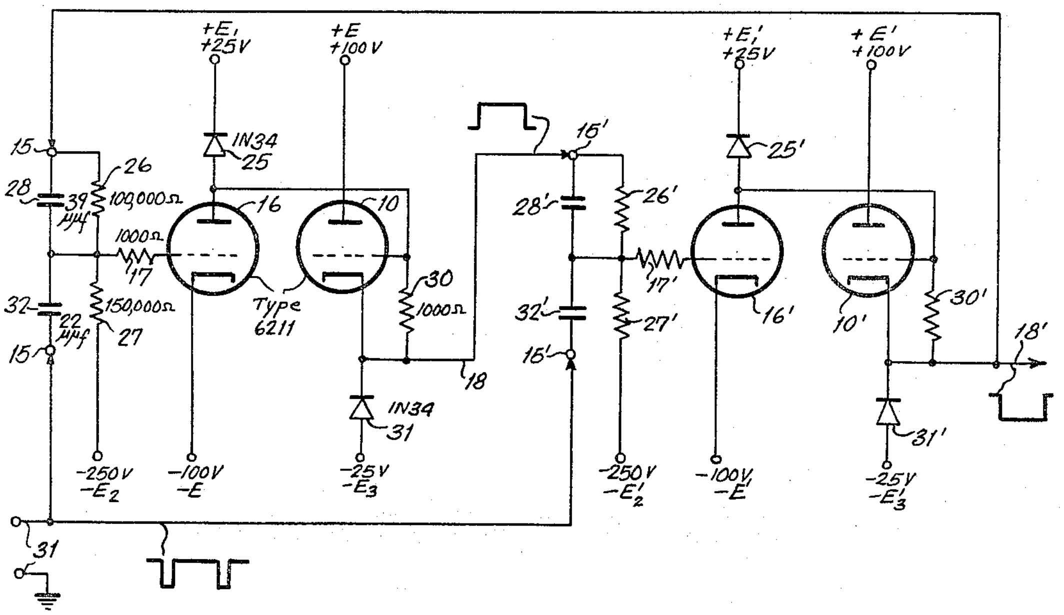
FIG. 4 is a circuit diagram representing an additionally modified form of the invention arranged as a bi-stable multivibrator.

Two FIG. 1 translating systems may be employed in tandem to provide a bi-stable multivibrator operable at several megacycles per second. FIG. 4 is a circuit diagram of such an arrangement, one pair of tubes 10, 16 and associated components being designated by reference numerals corresponding to those of FIG. 1 and the other pair of tubes 10′, 16′ and associated components by corresponding reference numerals primed. Representative operating potentials and component values shown for the first pair of tubes apply also to the second pair. It will be noted that in the FIG. 4 system the diode rectifier 31 is removed from its cathode to control electrode position shown in FIG. 1 and is inserted in the cathode lead of the tube 10 in FIG. 4. Further, the cathode load resistor 11 of the tube 10 and anode load resistor 24 of the tube 16 in the FIG. 1 system are dispensed with in the FIG. 4 arrangement, and the output circuit 18′ of the second pair of tubes is connected to the input circuit 15 of the first pair. A control circuit 31, to which is applied a synchronizing or control signal of pulse wave form, is coupled through a condenser 32 to the input circuit 15 of the first pair of tubes and through a condenser 32′ to the input circuit 15′ of the second pair. The operation of each pair of tubes and associated components in the FIG. 4 multivibrator is essentially similar to the FIG. 1 arrangement. The tubes 16 and 10′ are conductive together as are the tubes 10 and 16′.

In briefly considering the operation of the multivibrator, assume initially that the tubes 16 and 10' are in their conductive state and that a negative-going control pulse is applied to the control circuit 31. This pulse has no effect on the operation of the tube 16' which is already in its non-conductive state but does cause the tube 16 to become non-conductive. This causes the anode potential of the tube 16 and the control-electrode potential of the tube 10 to become more positive with the result that the tube 10 becomes conductive. The cathode of tube 10 thereupon becomes more positive with respect to ground by current flowing from the source +E to the source $+E_1$ through the resistor 30 and diode device 25, the diode device 31 providing isolation of the cathode from the source $-E_3$. The control electrode of the tubes 16' thereupon is raised to a more positive potential and causes this tube to become conductive. This in turn drives the tube 10' to its non-conductive state, and its cathode drops in potential similarly to drop the potential of the control electrode of tube 16 and thereby tends to bias the latter tube even more fully to its non-conductive state.

All of the tubes remain in this state until a second negative-going control pulse is applied to the control circuit 31. This pulse has no effect on tube 16 which is then non-conductive but does drive the tube 16' to its non-conductive state and thereby causes the tube 10' to become conductive. The cathode of the latter has its potential increased in a positive direction, and this increase is applied to the control electrode of the tube 16 to render the latter conductive and the tube 10 non-conductive. The anode current of tube 16 flows from the source $-E_3$ through the diode 31 and resistor 30 to the tube 16 and returns to the source −E, the diode device 25 isolating the anode of the tube 16 from the source $+E_1$. The cathode potential of tube 10 thereupon is made more negative by the conductive state of the device 31, and this change of potential is applied to the control electrode of the tube 16' to aid the control pulse in rendering the tube 16' non-conductive as already mentioned. This restores the multivibrator system to its initial condition and completes its cycle of multivibrator operation.

It will be noted that the potentials of the FIG. 4 output circuits 18 and 18' have potential variations in opposite sense and thus may be used together to provide oppositely phased outputs or used singly to provide either a positive-going output pulse or a negative-going output pulse as desired. The same is true of the anode elements of the tubes 16 and 16'.

Figure 5:
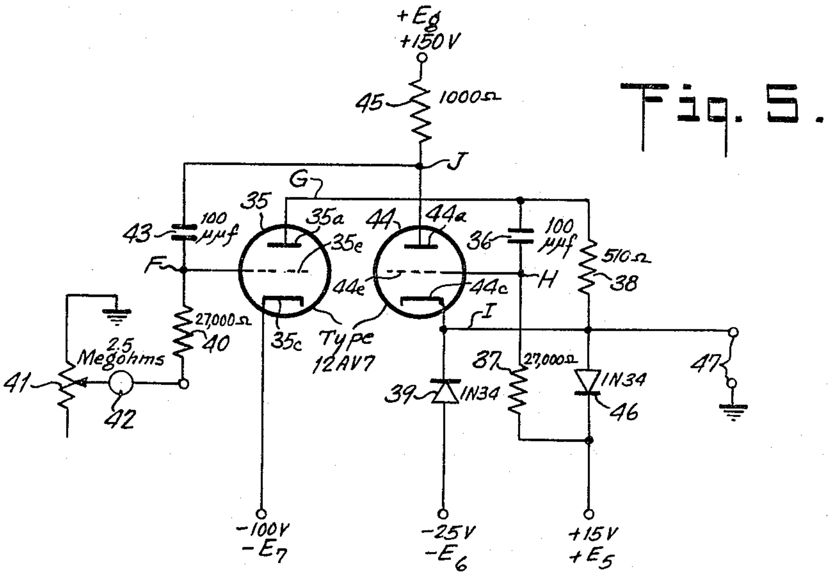
FIG. 5 represents yet another form of the invention in which the translating system is arranged as a free-running multivibrator.

FIG. 5 is a circuit diagram showing the invention as employed in a free-running type of multivibrator. The anode **35*a* of a tube 35 is coupled through a condenser 36 and a resistor 37 to a source $+E_5$ of energizing potential, indicated as having a representative value of 15 volts with respect to ground potential. It is also coupled through a resistor 38 and a diode rectifier 39 to a source $-E_6$ of negative potential having a representative value of −25 volts below ground. The cathode 35*c* of tube 35 is connected to a source $-E_7$ of larger negative potential of approximately −100 volts, and the control electrode 35*e* of this tube is connected through a fixed resistor 40 and an adjustable resistor 41 to ground. A source 42 of synchronizing or control signals of pulse wave form is shown as included in series in the control electrode circuit last mentioned, although it may equally well be coupled in shunt to the control electrode circuit as is well known. Control electrode 35*e* is also coupled through condenser 43 to the anode 44*a* of a tube 44, the anode being connected through a resistor 45 to a relatively large positive energizing potential source $+E_8$ which may have a representative value of approximately 150 volts above ground. The control electrode 44*e* of the tube 44 is connected to the juncture of the condenser 36 and resistor 37, while the cathode 44*c* of this tube is connected to the juncture of the resistor 38 and rectifier device 39 and is also coupled through a diode rectifier device 46** to the potential source $+E_5$.

Figure 6:
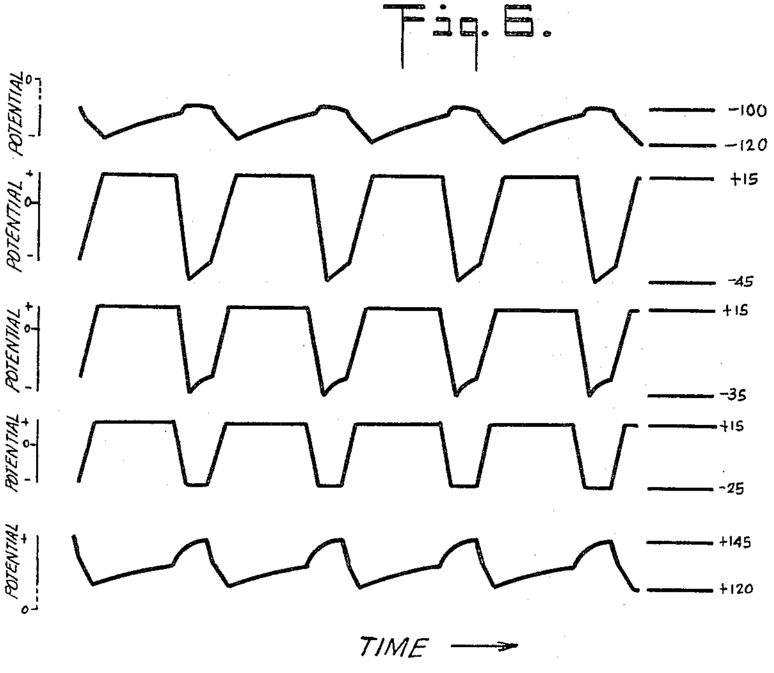
FIG. 6 graphically represents certain operating characteristics of the FIG. 5 arrangement and is used as an aid in explaining its operation.

Consider now the operation of the FIG. 5 multivibrator, and refer to the curves of FIG. 6 which indicate potential variations at selected points identified in FIG. 5 by letters corresponding to the letters identifying the several curves in FIG. 6. Assume at the outset that the tube 35 is fully conductive and the tube 44 non-conductive. The anode current for the tube 35 flows from the source $+E_6$ through the diode device 39 and the resistor 38 to the tube 35 and returns to the source $-E_7$. When the tube 44 became non-conductive at a previous time, the potential at point J in its anode circuit became more positive due to the disappearance of the voltage drop across the anode resistor 45. It was this increased positive potential which was coupled through the condenser 43 to the control electrode **35*e* of the tube 35 to render this tube conductive. As the condenser 43 becomes more fully charged, its decreasing value of charging current eventually becomes so small that the control electrode 35*e* no longer can maintain the tube 35 fully conductive. As its anode current begins to fall, the potential drop across the resistor 38 correspondingly decreases and the potential of the control electrode 44*e* becomes sufficiently positive that the tube 44 becomes conductive. With the tube 35 conductive, the condenser 36 charges through the resistor 37, applying a negative bias to the control electrode 44*e* in doing so, but eventually the charging current becomes insufficiently small to keep tube 44 non-conductive. The latter thereupon begins to conduct, and its anode current in flowing through the anode resistor 45 drops the anode potential which when applied through the condenser 43 correspondingly biases the control electrode 35*e* of the tube 35 negative to decrease the anode current of this tube. The anode potential of tube 35 increases to increase in a positive direction the potential of the control electrode 44*e* and thereby the anode current of the tube 44. This action is cumulative and rapidly renders the tube 44 fully conductive and the tube 35** fully non-conductive.

The anode to cathode current of the tube 44 flows from the source $+E_8$ through the resistor 45 to the tube 44 and thereafter through the diode rectifier 46 to the source $+E_5$, thus raising the cathode to a positive potential corresponding to that of the source $+E_5$. The charge in the condenser 43 slowly changes through the resistors 40 and 41 and eventually becomes sufficiently small as to be unable to produce a negative voltage across these resistors sufficient to bias the control electrode **35*e* of the tube 35 to the anode current cut-off. As the tube 35 once more becomes conductive, it again biases the tube 44 to anode current cut-off to repeat the cycle of operation described. Again this action is cumulative and the tube 35 is rapidly rendered fully conductive with the tube 44** fully non-conductive.

It will be noted from curve I of FIG. 5 that the alternate periods of conductivity of the rectifier devices 39 and 46 causes the potential at point I at the cathode circuit of tube 44 to vary between the values of the negative and positive potentials of the respective sources $-E_6$ and $+E_5$. An output circuit 47 may thus be connected to the cathode circuit to provide an output potential of pulse wave form having amplitude values above and below ground potential. The period of multivibrator operation may be changed by adjustment of the resistor 41, and may be controlled in periodicity by a synchronizing or control signal having positive-going pulses applied from the source 42. The representative component values indicated in FIG. 5 are suitable to provide multivibrator operation from 200 kilocycles to 2 megacycles per second with a pulse width of the order of ¼ microseconds. This operating frequency may readily be increased to above 5 megacycles by suitable change of the component values in a manner well understood in the art.

It will be apparent from the foregoing description that a pulse signal translating system embodying the invention is capable of translating with good fidelity pulses having exceedingly short rise and fall times even when the translated pulses are applied to transmission lines or other circuits having relatively large values of inherent capacitance. The high voltage gain of the translating system may even enhance the pulse rise and fall time if desired, and the translated pulse amplitude may be limited between pre-selected upper and lower amplitude flows. There is the further advantage that a translating system employing the invention has high utility either as a bi-stable or free-running multivibrator readily operable at several megacycles per second.

What is claimed is:

1. A pulse signal translating system comprising, first and second signal translating stages coupled in tandem with the first stage inverting a pulse signal appearing in its input circuit to one of opposite polarity in the input circuit of the other stage, and a single-ended output circuit common at least in part to both of said stages to have power supplied thereto by said other stage and power abstracted therefrom by said first stage, said other stage principally determining the pulse rise-time characteristic in said output circuit and said first stage principally determining the pulse fall-time characteristic therein said first signal translating stage being connected directly to a source of potential and to said output circuit through a bias impedance to provide minimum impedance to current flow from said load, said second signal translating stage being connected directly to a source of potential and to said output circuit through substantially zero impedance to provide minimum impedance to current flow into said load, wherein output pulses are generated into heavily loaded lines without distortion.

2. A pulse signal transmitting system comprising, first and second signal translating stages coupled in tandem with the first stage inverting a pulse signal appearing in its input circuit to one of opposite polarity in the input circuit of the other stage, and a single-ended output circuit common at least in part to both of said stages, one of said stages being of the cathode follower type having a cathode load impedance included in and principally determining the pulse rise-time characteristic in said output circuit and the other of said stages utilizing said impedance at least in part as an anode-circuit load impedance and principally determining the pulse fall-time characteristic in said output circuit said cathode follower stage being connected directly to a source of potential and to said output circuit through substantially zero impedance to provide minimum impedance to current flow from said load, said other stage being connected directly to a source of potential and to said output circuit through a bias impedance to provide minimum impedance to current flow into said load, wherein output pulses are generated into heavily loaded lines without distortion.

3. A pulse signal translating system comprising, first and second signal translating stages coupled in tandem with the first stage inverting a pulse signal appearing in its input circuit to one of opposite polarity in the input circuit of the other stage, and a single-ended output circuit common at least in part to both of said stages, one of said stages being of the cathode follower type having a cathode load impedance included in and principally determining the pulse rise-time characteristic in said output circuit and the other of said stages including a discharge device effectively connected in shunt to said load impedance and principally determining the pulse fall-time characteristic in said output circuit said cathode follower stage being connected directly to a source of potential and to said output circuit through substantially zero impedance to provide minimum impedance to current flow from said load, said other stage being connected directly to a source of potential and to said output circuit through a bias impedance to provide minimum impedance to current flow into said load, wherein output pulses are generated into heavily loaded lines without distortion.

4. A pulse signal translating system comprising, a source of pulse signals, first and second conductance controllable devices having conductance control electrodes, means coupling the control electrode of said first device to said source, means coupling the output electrodes of said first device to the input electrodes of said second device as a polarity inverter, said devices having unidirectional current translating characteristics, and an opposing polarity coupling between an output electrode of each of said devices and a common single-ended output circuit such that said second device supplies power to and principally determines the pulse rise-time characteristic in said output circuit and said one device abstracts power from and principally determines the pulse fall-time characteristic therein said first signal translating stage being connected directly to a source of potential and to said output circuit through a bias impedance to provide minimum impedance to current flow from said load, said second signal translating stage being connected directly to a source of potential and to said output circuit through substantially zero impedance to provide minimum impedance to current flow into said load, wherein output pulses are generated into heavily loaded lines without distortion.

References Cited

UNITED STATES PATENTS

| | | | |
|---|---|---|---|
| 2,412,542 | 12/1946 | Smith. | |
| 2,426,256 | 8/1947 | Zenor. | |
| 2,489,272 | 11/1949 | Daniels | 330—49 |
| 2,549,875 | 4/1951 | Wililams et al. | |
| 2,670,409 | 2/1954 | Cooper | 330—97 |
| 2,700,732 | 1/1955 | Holdam et al. | |
| 2,710,913 | 6/1955 | Sherertz. | |
| 2,789,220 | 4/1957 | Lubkin et al. | 328—28 |
| 2,821,626 | 1/1958 | Freedman. | |
| 3,192,479 | 6/1965 | Von Kummer. | |

ROY LAKE, *Primary Examiner.*

GEORGE N. WESTBY, ELI J. SAX, HARRY GAUSS, SIMON YAFFEE, ARTHUR GAUSS, *Examiners.*

K. O. CORLEY, M. REICH, D. R. PRESSMAN, A. T. LANE, M. A. SILEO, N. KAUFMAN, *Assistant Examiners.*